U S010450964B2

United States Patent
Spagnoletti (10) Patent No.: US 10,450,964 B2
(45) Date of Patent: Oct. 22, 2019

(54) VARIABLE PRESSURE AIR SUPPLY (71) Applicant: Hamilton Sundstrand Corporation, Charlotte, NC (US)

(72) Inventor: Anthony Spagnoletti, Newington, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 600 days.

(21) Appl. No.: 14/944,363

(22) Filed: Nov. 18, 2015

(65) Prior Publication Data

US 2016/0123237 A1  May 5, 2016

Related U.S. Application Data (63) Continuation of application No. PCT/US2014/043025, filed on Jun. 18, 2014.

(60) Provisional application No. 61/870,163, filed on Aug. 26, 2013.

(51) Int. Cl.
| | |
|---|---|
| *F02C 6/08* | (2006.01) |
| *F01D 25/12* | (2006.01) |
| *F02C 7/14* | (2006.01) |
| *F02C 7/18* | (2006.01) |
| *F02C 9/18* | (2006.01) |
| *F16K 11/06* | (2006.01) |
| *F16K 27/04* | (2006.01) |

(52) U.S. Cl.
CPC .......... *F02C 9/18* (2013.01); *F02C 6/08* (2013.01); *F02C 7/14* (2013.01); *F02C 7/18* (2013.01); *F16K 11/06* (2013.01); *F16K 27/04* (2013.01); *F01D 25/125* (2013.01); *F05D 2260/606* (2013.01); *Y02T 50/675* (2013.01); *Y10T 137/86815* (2015.04)

(58) Field of Classification Search
CPC ...... F02C 9/18; F02C 7/14; F02C 7/16; F02C 6/08; F16C 37/007; F16K 11/065; F16K 11/0655; F16K 11/06–11/0716; F16K 3/0209; F16K 3/34; F16K 27/04; F16K 27/041; F16K 27/044; F16K 27/047; F01D 25/128; Y10T 137/86815; Y10T 137/86919
USPC ............................................ 137/625.4, 627.5
See application file for complete search history.

(56) References Cited

U.S. PATENT DOCUMENTS

| | | | |
|---|---|---|---|
| 2,925,712 A | 2/1960 | Johnson et al. | |
| 2,996,082 A * | 8/1961 | Miner | ................. F16K 31/0613 137/625.4 |

(Continued)

OTHER PUBLICATIONS

International Search Report and Written Opinion dated Oct. 29, 2014 in Application No. PCT/US2014/043025.

(Continued)

*Primary Examiner* — Alain Chau
(74) *Attorney, Agent, or Firm* — Snell & Wilmer, L.L.P.

(57) ABSTRACT

The present disclosure relates to engine buffer systems. An engine buffer system may include a low pressure supply line and a high pressure supply line. A continuously variable valve may be coupled to and/or in fluid communication with the low pressure supply line and the high pressure supply line. The continuously variable valve may be adjusted to supply any pressure between a pressure of the low pressure supply line and a pressure of the high pressure supply line to a buffer line.

19 Claims, 6 Drawing Sheets

(56) References Cited

U.S. PATENT DOCUMENTS

| | | | | |
|---|---|---|---|---|
| 3,530,893 | A | * | 9/1970 | Masuda .................. F15B 13/04 137/625.21 |
| 4,284,103 | A | * | 8/1981 | Pemberton .......... F16K 11/0655 137/625 |
| 4,579,143 | A | * | 4/1986 | Rollins .................. F23K 5/147 137/238 |
| 5,161,364 | A | * | 11/1992 | Bruun .................... B64D 13/04 60/772 |
| 5,238,018 | A | * | 8/1993 | Hashida ................. B60T 8/367 137/112 |
| 5,531,566 | A | | 7/1996 | Derouet et al. |
| 5,706,852 | A | * | 1/1998 | Deville ................. F16K 27/044 137/486 |
| 6,662,819 | B1 | * | 12/2003 | Watson ................. F17C 13/045 137/113 |
| 2006/0070655 | A1 | * | 4/2006 | Tebby ................. F04D 27/0215 137/112 |
| 2008/0118371 | A1 | * | 5/2008 | Vasquez .................... F02C 3/32 417/77 |
| 2009/0293492 | A1 | * | 12/2009 | Tentorio ................. F02C 7/232 60/772 |
| 2010/0092116 | A1 | * | 4/2010 | Franconi ............... F01D 25/125 384/317 |
| 2010/0154896 | A1 | * | 6/2010 | Thrash, Jr. ............ F16K 11/044 137/112 |
| 2010/0199679 | A1 | * | 8/2010 | Edwards ................. F01D 17/10 60/773 |
| 2011/0129332 | A1 | | 6/2011 | Behaghel et al. |
| 2012/0216545 | A1 | | 8/2012 | Sennoun et al. |
| 2013/0192238 | A1 | * | 8/2013 | Munsell .................... F02C 6/08 60/772 |
| 2013/0192239 | A1 | * | 8/2013 | Glahn .................... F01D 25/18 60/772 |
| 2013/0192250 | A1 | * | 8/2013 | Glahn .................... F01D 11/04 60/782 |
| 2014/0366971 | A1 | * | 12/2014 | Elms ....................... F16K 11/00 137/625.48 |

OTHER PUBLICATIONS

International Preliminary Report on Patentability dated Mar. 1, 2016 in Application No. PCT/US2014/043025.

Extended European Search Report dated Aug. 3, 2016 in European Application No. 14839333.3.

European Patent Office, European Office Action dated Jan. 14, 2019 in Application No. 14839333.3.

* cited by examiner

VARIABLE PRESSURE AIR SUPPLY

CROSS-REFERENCE TO RELATED APPLICATIONS

This application is a continuation of, claims priority to and the benefit of, PCT/US2014/043025 filed on Jun. 18, 2014 and entitled "VARIABLE PRESSURE AIR SUPPLY," which claims priority from U.S. Provisional Application No. 61/870,163 filed on Aug. 26, 2013 and entitled "VARIABLE PRESSURE AIR SUPPLY." Both of the aforementioned applications are incorporated herein by reference in their entirety.

FIELD OF INVENTION

The present disclosure relates generally to turbine engines. More particularly, the present disclosure relates to systems for providing pressurized air to turbine engine components.

BACKGROUND OF THE INVENTION

Gas turbine engines (such as those used in electrical power generation or used in modern aircraft) typically include a compressor, a combustion section, and a turbine. Pressurized air from multiple stages in the compressor may be supplied to various engine components. As engine power output varies, the air pressure at a single location in the compressor may vary as well. Pressurized air for a buffer system may be supplied from two or more different locations in the compressor. During low power output of the engine, the compressor pressure may be relatively low, and a relatively higher pressure location may be used to supply the buffer system. During high power output of the engine, the compressor pressure may be relatively high, and a relatively lower pressure location may be used to supply the buffer system. The rapid change between pressures when switching between the high and low pressure locations may cause damage or wear to various components supplied by the buffer system.

SUMMARY OF THE INVENTION

A buffer system is disclosed. In various embodiments, the buffer system may comprise a low pressure supply line, a high pressure supply line, and a variable valve in fluid communication with the low pressure supply line and the high pressure supply line. The variable valve may comprise a low pressure orifice and a high pressure orifice. The buffer system may further comprise an actuator configured to translate the variable valve. The variable valve may be configured to allow pressurized air from the low pressure supply line and the high pressure supply line to pass through the variable valve simultaneously.

A system for regulating buffer pressure is disclosed. In various embodiments, the system may comprise a low pressure supply line, a high pressure supply line, and a continuously variable valve coupled to the low pressure supply line and the high pressure supply line. The system may further include a sensor configured to measure an engine operating parameter, and a computer system configured to determine a desired position of the continuously variable valve based on a measurement by the sensor. The system may include an actuator configured to apply a force to the continuously variable valve in response to an instruction from the computer system.

A method for regulating air pressure in a buffer system is disclosed. In various embodiments, the method may include measuring, using a sensor, an engine operating parameter, and determining, by a computer system and in response to the measuring, a desired position of a variable valve. The computer system may transmit an instruction to an actuator to move the variable valve to the desired position. The actuator may apply a force to the variable valve to move the variable valve to the desired position. The actuator may move the variable valve to a low pressure mode in response to the sensor measuring a high engine speed. In various embodiments, the actuator may move the variable valve to a high pressure mode in response to the sensor measuring a low engine speed. The actuator may move the variable valve to a position in between a high pressure mode and a low pressure mode in response to the sensor measuring an intermediate engine speed.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
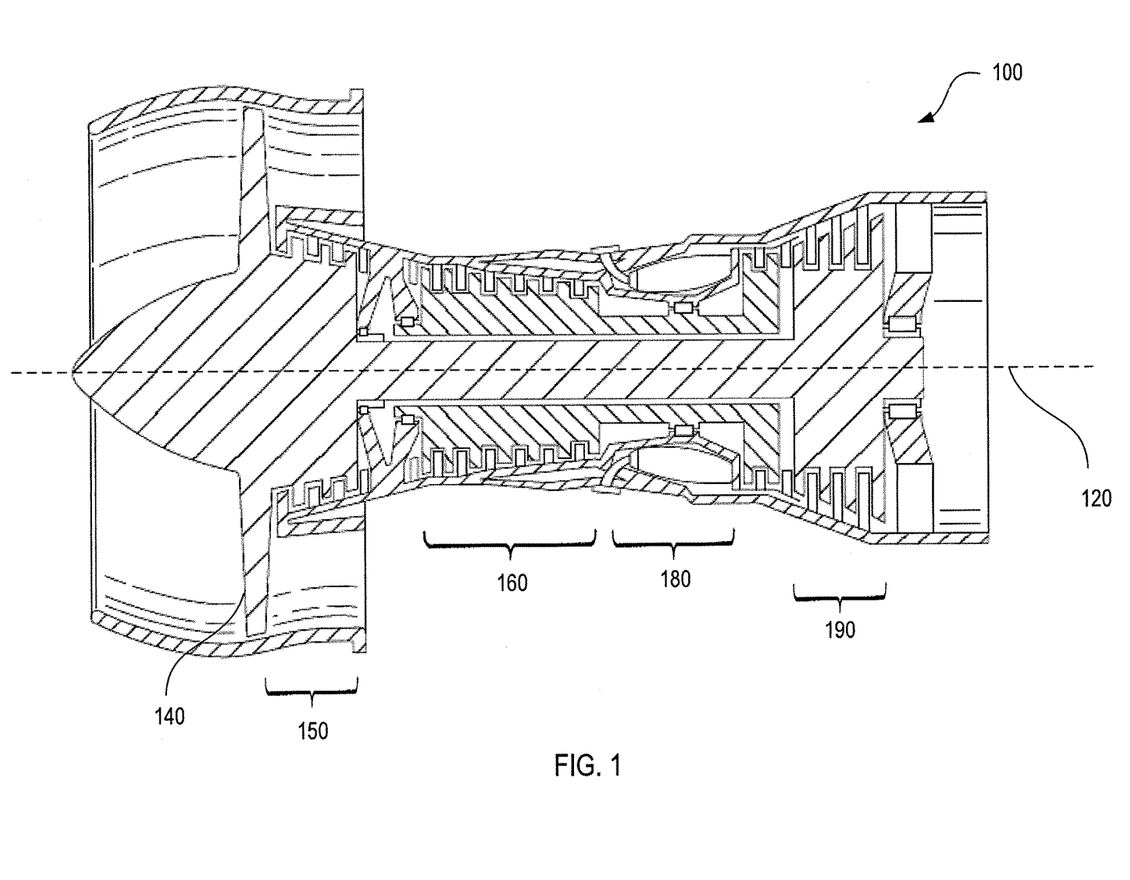
FIG. 1 illustrates a schematic axial cross-section view of a gas turbine engine according to various embodiments of the disclosure.

Referring to FIG. 1, a gas turbine engine 100, such as a turbofan gas turbine engine, is illustrated according to various embodiments. Gas turbine engine 100 is disposed about axial centerline axis 120, which may also be referred to as axis of rotation 120. Gas turbine engine 100 may comprise a fan 140, low pressure compressor section 150, high pressure compressor section 160, a combustion section 180, and a turbine section 190. Air compressed in the compressor sections 150, 160 may be mixed with fuel and burned in combustion section 180 and expanded across turbine section 190. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
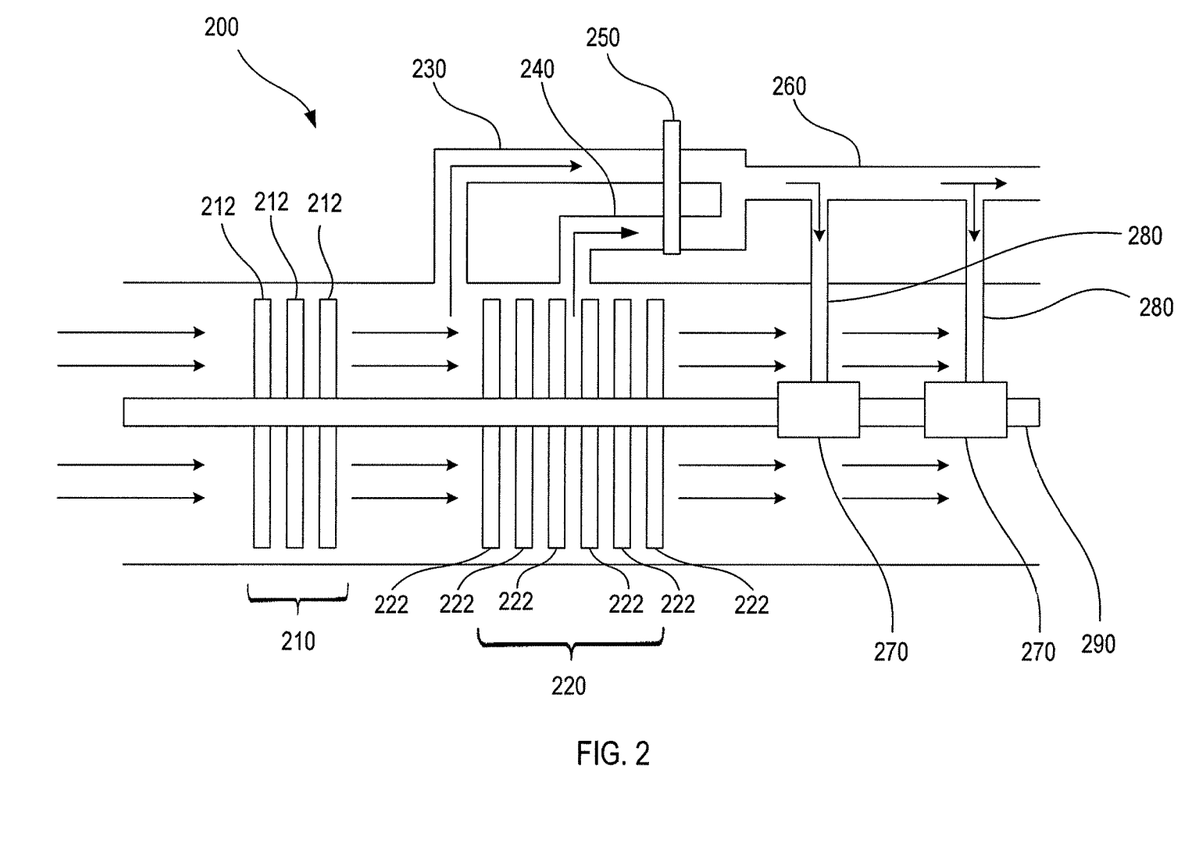
FIG. 2 illustrates a schematic view of a variable pressure air supply system according to various embodiments.

Referring to FIG. 2, a schematic view of an engine buffer system 200 is illustrated according to various embodiments. Engine buffer system 200 may comprise low pressure compressor section 210, high pressure compressor section 220, low pressure supply line 230, high pressure supply line 240, variable valve 250, and buffer line 260. Engine buffer system 200 may supply pressurized air to various components. For example, in various embodiments, engine buffer system 200 may supply pressurized air to compartments for bearings 270 via bearing supply lines 280. The pressurized air may assist in sealing bearings 270 around shaft 290. In various embodiments, engine buffer system 200 may also supply cooling air to various cavities within the engine, and supply air to anti-ice systems on an aircraft nose cone and wings.

As air flows through low pressure compressor section 210 and high pressure compressor section 220, air pressure increases at each stage 212 of low pressure compressor section 210 and each stage 222 of high pressure compressor section 220. In various embodiments, and as illustrated in FIG. 2, low pressure supply line 230 may be located between low pressure compressor section 210 and high pressure compressor section 220, and high pressure supply line 240 may be located between intermediate stages 222 of high pressure compressor section 220. The intermediate stages 222 of high pressure compressor section may be the stages other than the most forward stage or the most aft stage. Thus, the air pressure in low pressure supply line 230 may be less than the air pressure in high pressure supply line 240, as the air in high pressure supply line 240 has been compressed by at least one stage 222 of high pressure compressor section 220. In various embodiments, the low pressure supply line 230 and the high pressure supply line 240 may be located in different locations, such as forward of low pressure compressor section 210, between stages 212 of low pressure compressor section 210, between low pressure compressor section 210 and high pressure compressor section 220, between intermediate stages 222 of high pressure compressor section 220, and aft of high pressure compressor section 220. The specific location may vary based on different engine and aircraft specifications.

During engine operation, the air pressures at low pressure supply line 230 and high pressure supply line 240 may vary. For example, during engine idle the air pressures may be relatively low, during takeoff the air pressures may be relatively high, and during cruise the air pressures may be between those during idle and takeoff. In various embodiments, variable valve 250 may selectively transmit air from low pressure supply line 230, high pressure supply line 240, or a combination of both low pressure supply line 230 and high pressure supply line 240 to buffer line 260. The selected supply may depend based on the pressure requirements of buffer line 260, and the available pressures at low pressure supply line 230 and high pressure supply line 240. For example, during engine idle, the desired pressure in buffer line 260 may be equal to the pressure in high pressure supply line 240, or may be greater than is available from either low pressure supply line 230 or high pressure supply line 240, and variable valve 250 may allow full transmission of air from high pressure supply line 240 to buffer line 260. Conversely, during takeoff the desired pressure in buffer line 260 may be equal to the pressure in low pressure supply line 230, or may be less than the air pressure in low pressure supply line 230 and high pressure supply line 240, and variable valve 250 may allow full or partial transmission of air from low pressure supply line 230 to buffer line 260 while preventing transmission of air from high pressure supply line 240 to buffer line 260. At certain engine operating points, the desired pressure in buffer line 260 may be between the pressure in low pressure supply line 230 and high pressure supply line 240, and variable valve 250 may allow partial transmission of air from low pressure supply line 230, and partial transmission of air from high pressure supply line 240 to buffer line 260, such that the desired pressure in buffer line 260 may be achieved.

Figure 3A:
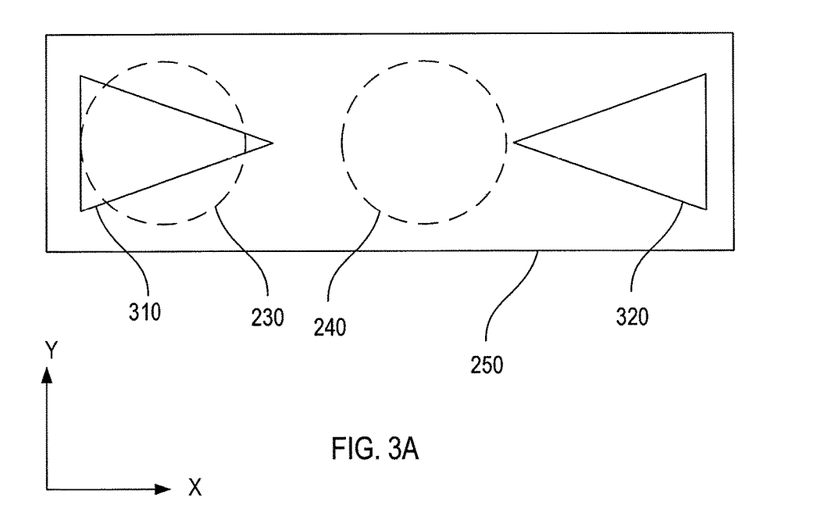
FIGS. 3A and 3B illustrate a cross-section view of a variable valve with triangular orifices in various positions according to various embodiments.

Referring to FIG. 3A, a cross section of variable valve 250 in a low pressure state is illustrated according to various embodiments. Variable valve 250 may comprise low pressure orifice 310 and high pressure orifice 320. In an embodiment, the locations of low pressure supply line 230 and high pressure supply line 240 are illustrated in dashed lines. Variable valve 250 may be configured to move translationally in the x-direction. As variable valve 250 moves, a relative percentage of high and low pressure air entering variable valve 250 may change an exit pressure that is supplied to a buffer system. In various embodiments, variable valve 250 may be a continuously variable valve, such that, depending on a location of variable valve 250, variable valve 250 may allow any level of pressure between a pressure in low pressure supply line 230 and high pressure supply line 240 to be transmitted to buffer line 260.

As illustrated in FIG. 3A, low pressure orifice 310 is aligned with low pressure supply line 230, and high pressure orifice 320 is not aligned with high pressure supply line 240. Thus, in the state shown in FIG. 3A, variable valve 250 may allow low pressure air from low pressure supply line 230 to pass through variable valve 250 into buffer line 260, while preventing high pressure air from high pressure supply line 240 from entering buffer line 260.

Figure 3B:
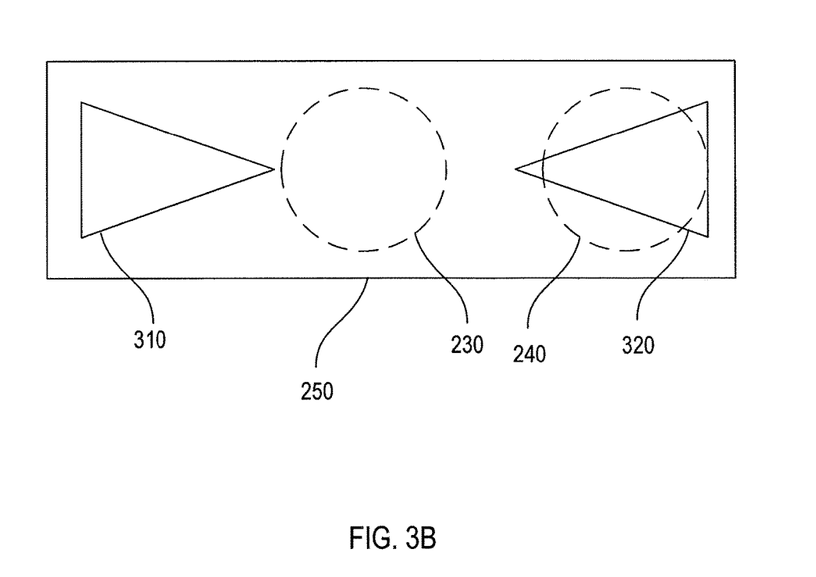

As illustrated in FIG. 3B, variable valve 250 is illustrated in a high pressure state according to various embodiments. In FIG. 3B, variable valve has moved in the negative x-direction with respect to low pressure supply line 230 and high pressure supply line 240 as compared to FIG. 3A. In FIG. 3B, high pressure orifice 320 is aligned with high pressure supply line 240, and low pressure orifice 310 is not aligned with low pressure supply line 230. Thus, in the high pressure state shown in FIG. 3B, variable valve 250 may allow high pressure air from high pressure supply line 240 to pass through variable valve 250 into buffer line 260, while preventing low pressure air from low pressure supply line 230 from entering buffer line 260.

As variable valve 250 translates from the low pressure state illustrated in FIG. 3A to the high pressure state illustrated in FIG. 3B, variable valve 250 may gradually change the output pressure to buffer line 260. In various embodiments, as variable valve 250 moves in the negative x-direction, an amount of overlap between low pressure orifice 310 and low pressure supply line 230 may gradually decrease, while an amount of overlap between high pressure orifice 320 and high pressure supply line 240 may gradually increase. Thus, at locations in between the low pressure state and the high pressure state, variable valve 250 may allow at least some air from low pressure supply line 230 and at least some air from high pressure supply line 240 to enter buffer line 260. In various embodiments, a desired pressure of buffer line 260 may be between the pressure in low pressure supply line 230 and high pressure supply line 240, and a location of variable valve 250 may be selected such that air from low pressure supply line 230 and air from high pressure supply line 240 are mixed to achieve the desired pressure in buffer line 260.

In various embodiments, a cross-section of low pressure orifice 310 and/or high pressure orifice 320 may be substantially triangular. As illustrated, in various embodiments a cross-section of low pressure supply line 230 and high pressure supply line 240 at the interface with variable valve 250 may be substantially circular. Thus, as variable valve 250 moves in the x-direction, an area of overlap between low pressure orifice 310 and low pressure supply line 230 may change, and an area of overlap between high pressure orifice 320 and high pressure supply line 240 may change. However, in various embodiments, a cross-sectional shape of low pressure orifice 310, high pressure orifice 320, low pressure supply line 230, and high pressure supply line 240 may be any shape, including square, ovoid, rectangular, irregular, or any other shape.

Figure 4:
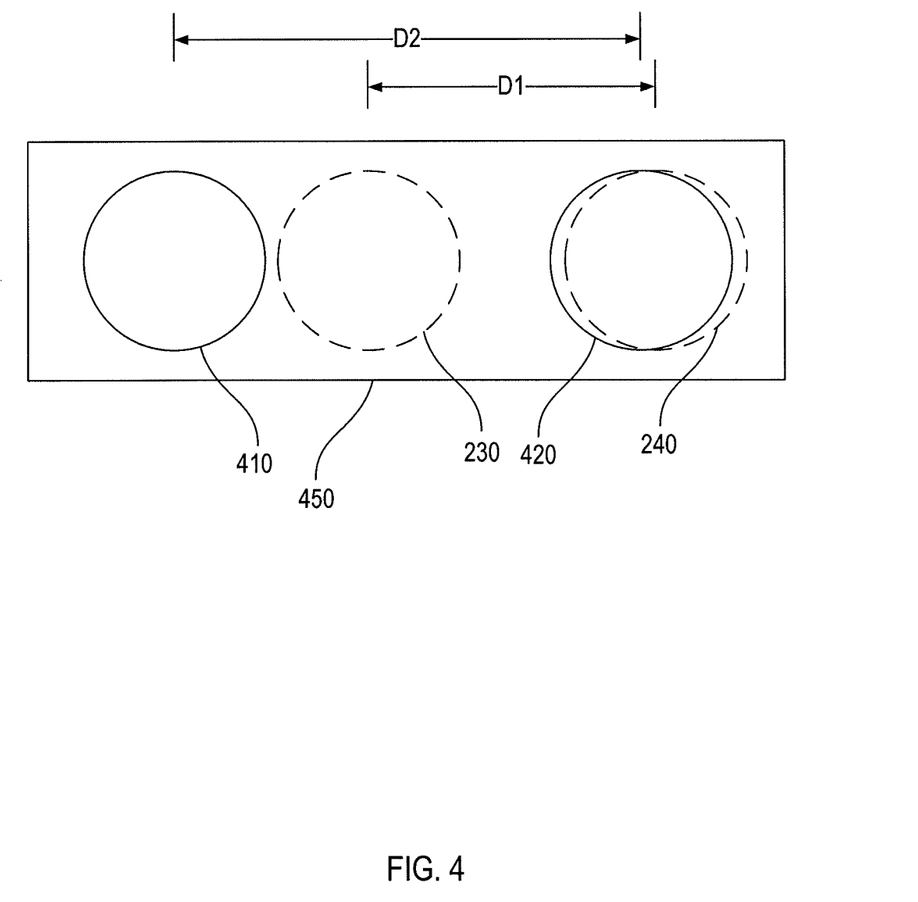
FIG. 4 illustrates a cross-section view of a variable valve with circular orifices according to various embodiments.

Referring to FIG. 4, a variable valve 450 with circular orifices is illustrated according to various embodiments. Variable valve 450 is illustrated near the high pressure state, wherein high pressure orifice 420 is aligned with high pressure supply line 240. In various embodiments, a distance D1 between a center of low pressure supply line 230 and a center of high pressure supply line 240 may be less than a distance D2 between a center of low pressure orifice 410 and high pressure orifice 420. Thus, in response to low pressure orifice 410 being aligned with low pressure supply line 230, high pressure orifice 420 is not aligned with high pressure supply 340, and in response to high pressure orifice 420 being aligned with high pressure supply line 240, low pressure orifice 410 is not aligned with low pressure supply line 230. However, in various embodiments, distance D1 may be greater than distance D2, or distance D1 may be equal to distance D2. Variable valve 450 may be translated such that only low pressure supply line 230 and low pressure orifice 410 overlap, such that only high pressure supply line 240 and high pressure orifice 420 overlap, or such that a portion of low pressure supply line 230 and low pressure orifice 410 overlap and a portion of high pressure supply line 240 and high pressure orifice 420 overlap.

Figure 5:
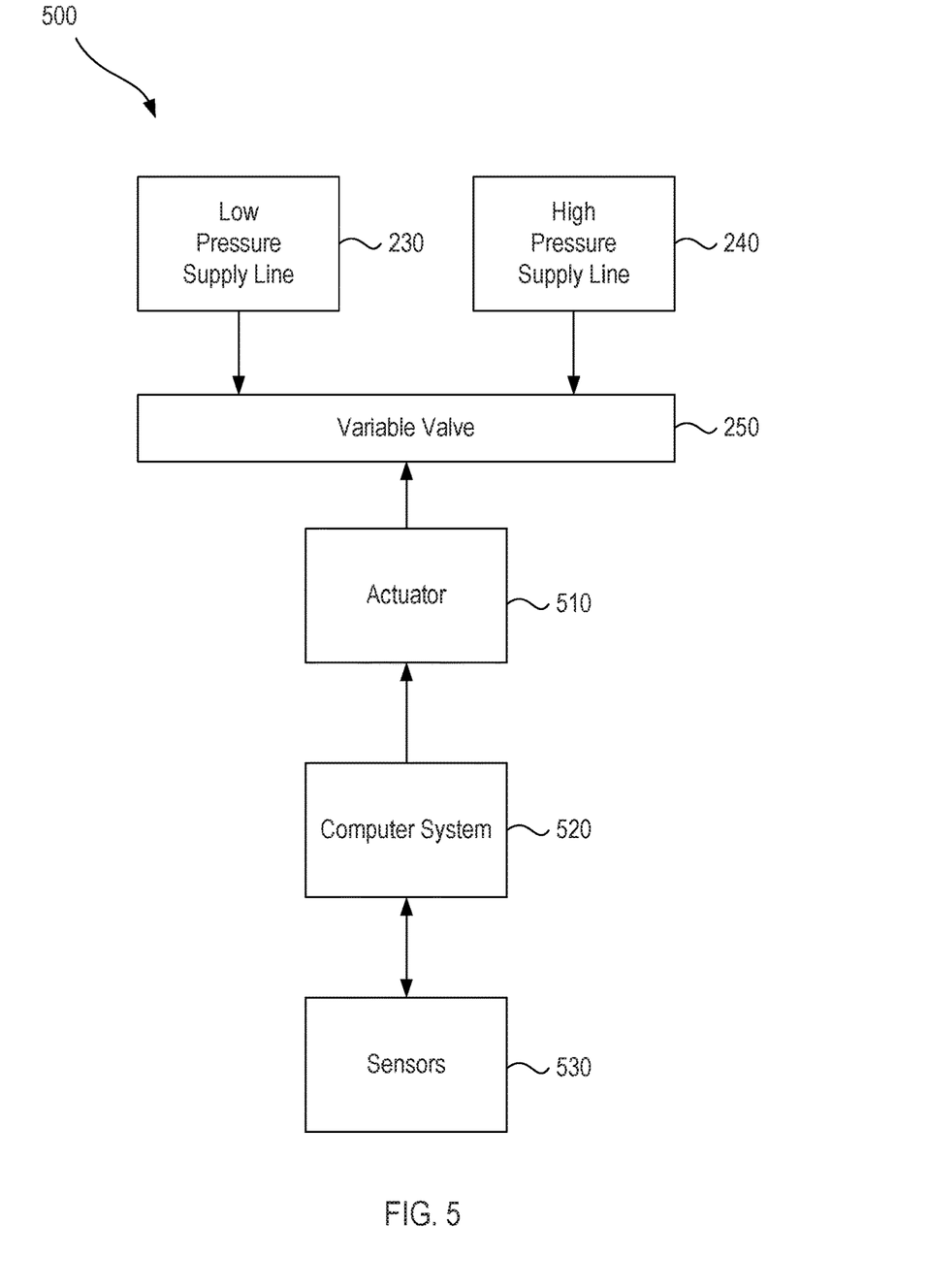
FIG. 5 illustrates a schematic view of a system for regulating buffer pressure according to various embodiments.

Referring to FIG. 5, a system 500 for regulating air pressure in a buffer system is illustrated according to various embodiments. System 500 may comprise low pressure supply line 230, high pressure supply line 240, variable valve 250, actuator 510, computer system 520, and sensors 530. Actuator 510 may be configured to apply a force to variable valve 250 in order to cause translational movement of variable valve 250. The translational movement may cause variable valve 250 to allow air from low pressure supply line 230, air from high pressure supply line 240, or a combination of both to pass through variable valve 250. Actuator 510 may comprise any type of motor capable of translating or at least partially rotating variable valve 250. In various embodiments, actuator 510 may utilize electromagnetism, hydraulics, pneumatics, or any other energy source in order to translate or rotate variable valve 250.

Computer system 520 may include a processor for controlling pressurized air in the buffer system. In various embodiments, computer system 520 may include a tangible, non-transitory memory configured to communicate with the processor. Computer system 520 may be in communication with sensors 530. Sensors 530 may comprise a variety of sensor types. For example, in various embodiments, sensors 530 may comprise pressure sensors, temperature sensors, power sensors, speed sensors, or any other type of aircraft sensors. In various embodiments, sensors 530 may comprise an actuator position sensor. The actuator position sensor may determine a position of variable valve 250 and may determine if variable valve 250 becomes jammed or stuck. In various embodiments, sensors 530 may comprise a pressure sensor in buffer line 260. Sensors 530 may transmit readings to computer system 520. Based on the readings, computer system 520 may operate an algorithm to determine a position for variable valve 250 in order to achieve a desired pressure in buffer line 260. Computer system 520 may transmit instructions to actuator 510, and actuator 510 may move variable valve 250 to the desired position.

In various embodiments, variable valve 250 may be a self-regulating valve. Variable valve 250 may be biased toward the high pressure state. For example, a spring (not shown) may apply a force to variable valve 250 such that variable valve 250 allows air from high pressure supply line 240 to pass through variable valve 250 into buffer line 260. Pressurized air from buffer line 260 may be applied to variable valve 250 to counteract the force from the spring. Thus, in response to the pressure in buffer line 260 increasing above a desired level, the pressurized air from buffer line 260 may overcome the force applied by the spring, and the pressurized air from buffer line 260 may cause variable valve 250 to translate to a low pressure state, such that variable valve 250 allows air from low pressure supply line 230 to pass through variable valve 250.

Figure 6:
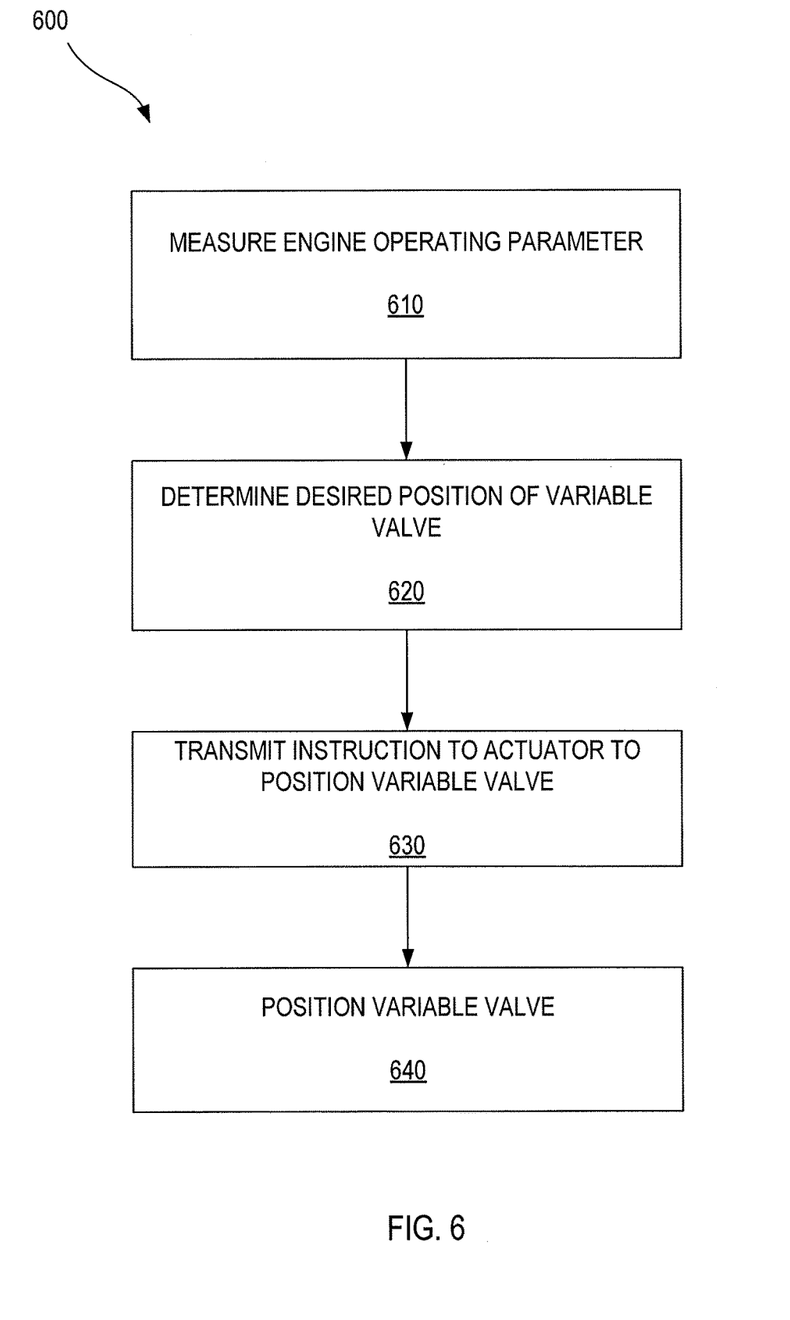
FIG. 6 illustrates a process for regulating buffer pressure according to various embodiments.

Referring to FIG. 6, a method 600 for regulating buffer system pressure is illustrated according to various embodiments. In various embodiments, a sensor may measure an engine operating parameter (block 610). For example, in various embodiments the engine operating parameter may be one or more of engine speed, power, air pressure, temperature, exhaust temperature, buffer line pressure, the variable valve position, etc. The sensor may transmit the measurement to a computer system, and based on the measurement, the computer system may determine a desired position of a variable valve (block 620). In various embodiments, in response to the sensor measuring an engine parameter, such as during engine idle, computer system may determine that the desired position of the variable valve is in a higher or lower mode.

In various embodiments, the computer system may transmit an instruction to an actuator to position the variable valve to a higher or lower mode based on the desired position (block 630). The actuator may apply a force to the variable valve to position the variable valve in the desired position (block 640).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching may be used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A buffer system comprising:
    a low pressure supply line;
    a high pressure supply line, wherein the low pressure supply line and high pressure supply line comprise circular cross-sectional shapes; and
    a variable valve in fluid communication with the low pressure supply line and the high pressure supply line, wherein the variable valve comprises a low pressure orifice and a high pressure orifice and the variable valve is configured to translate in a first direction and a second direction perpendicular to the low pressure supply line and high pressure supply line, and wherein the low pressure orifice and high pressure orifice comprise triangular cross-sectional shapes such that an amount of overlap between the low pressure orifice and the low pressure supply line gradually decreases as the variable valve moves in the first direction and an amount of overlap between the high pressure orifice and the high pressure supply line gradually decreases as the variable valve moves in the second direction.

2. The buffer system of claim 1, further comprising an actuator configured to translate the variable valve.

3. The buffer system of claim 1, wherein the variable valve is configured to allow pressurized air from the low pressure supply line and the high pressure supply line to pass through the variable valve simultaneously.

4. The buffer system of claim 1, wherein a distance between the low pressure orifice and the high pressure orifice is greater than a distance between the low pressure supply line and the high pressure supply line.

5. The buffer system of claim 1, wherein the low pressure supply line is in fluid communication with at least one of a low pressure compressor and a stage between the low pressure compressor and a high pressure compressor.

6. The buffer system of claim 1, wherein the high pressure supply line is in fluid communication with an intermediate stage of a high pressure compressor.

7. The buffer system of claim 1, wherein the buffer system is configured to provide pressurized air to an engine bearing compartment.

8. The buffer system of claim 1, wherein, in response to a desired pressure being between a pressure in the low pressure supply line and a pressure in the high pressure supply line, the variable valve is configured to transmit air from both the low pressure supply line and the high pressure supply line through the variable valve.

9. The buffer system of claim 1, wherein the variable valve is self-regulating.

10. The buffer system of claim 1, wherein the variable valve comprises a continuously variable valve.

11. A system for regulating buffer pressure comprising:
    a low pressure supply line;
    a high pressure supply line, wherein the low pressure supply line and high pressure supply line comprise circular cross-sectional shapes;
    a continuously variable valve coupled to the low pressure supply line and the high pressure supply line and configured to translate in a first direction and a second direction perpendicular to the low pressure supply line and high pressure supply line, the variable valve comprising a low pressure orifice and a high pressure orifice, the low pressure orifice and the high pressure orifice comprising triangular cross-sectional shapes;
    a sensor configured to measure an engine operating parameter;
    a computer system configured to determine a desired position of the continuously variable valve based on a measurement by the sensor; and
    an actuator configured to apply a force to the continuously variable valve in response to an instruction from the computer system, wherein an amount of overlap between the low pressure orifice and the low pressure supply line gradually decreases as the variable valve moves in the first direction and an amount of overlap between the high pressure orifice and the high pressure supply line gradually increases as the variable valve moves in the first direction.

12. The system of claim 11, wherein a distance between the low pressure orifice and the high pressure orifice is greater than a distance between the low pressure supply line and the high pressure supply line.

13. The system of claim 11, wherein in response to the sensor measuring a high engine speed, the computer system is configured to instruct the actuator to move the continuously variable valve to a low pressure mode.

14. The system of claim 11, wherein in response to the sensor measuring an intermediate engine speed, the computer system is configured to instruct the actuator to move the continuously variable valve to a position in between a high pressure mode and a low pressure mode.

15. A method comprising:
measuring an engine operating parameter;
determining, by a computer processor, and in response to the measuring, a desired position of a variable valve;
transmitting an instruction to an actuator to move the variable valve to the desired position; and
applying a force to the variable valve to move the variable valve to the desired position,
wherein the variable valve is in fluid communication with a low pressure supply line and a high pressure supply line, the low pressure supply line and the high pressure supply line comprising circular cross-sectional shapes, wherein the moving of the variable valve to the desired position comprises selectively translating the variable valve in a first direction and a second direction perpendicular to the low pressure supply line and high pressure supply line, and wherein a low pressure orifice and high pressure orifice of the variable valve comprise triangular cross-sectional shapes such that an amount of overlap between the low pressure orifice and the low pressure supply line gradually decreases as the variable valve moves in the first direction and an amount of overlap between the high pressure orifice and the high pressure supply line gradually decreases as the variable valve moves in the second direction.

16. The method of claim 15, wherein the variable valve comprises a continuously variable valve.

17. The method of claim 15, wherein the actuator moves the variable valve to a low pressure mode based on the measured engine operating parameter.

18. The method of claim 15, wherein the actuator moves the variable valve to a high pressure mode based on the measured engine operating parameter.

19. The method of claim 15, wherein the actuator moves the variable valve to a position in between a high pressure mode and a low pressure mode based on the measured engine operating parameter.

* * * * *